Oct. 9, 1951 J. M. LESTER 2,570,251
PULSE ECHO DIRECTION AND DISTANCE INDICATOR
Filed June 8, 1946 3 Sheets-Sheet 1

INVENTOR
JOHN M. LESTER
BY
ATTORNEY

Oct. 9, 1951  J. M. LESTER  2,570,251
PULSE ECHO DIRECTION AND DISTANCE INDICATOR
Filed June 8, 1946  3 Sheets-Sheet 2

INVENTOR
JOHN M. LESTER
BY
ATTORNEY

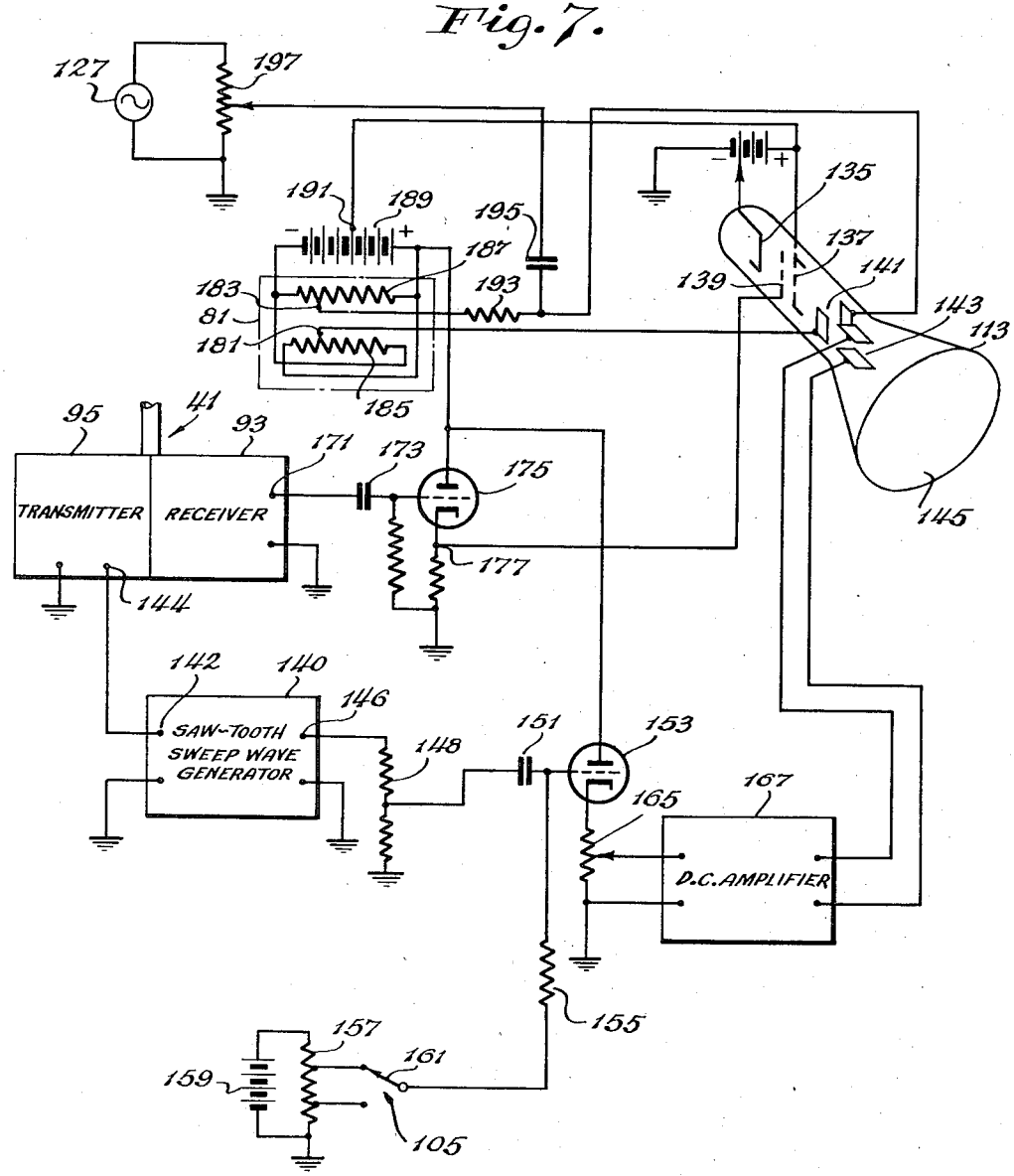

Patented Oct. 9, 1951

2,570,251

UNITED STATES PATENT OFFICE 2,570,251

PULSE ECHO DIRECTION AND DISTANCE INDICATOR

John M. Lester, Hempstead, N. Y., assignor to The Sperry Corporation, a corporation of Delaware Application June 8, 1946, Serial No. 675,402

3 Claims. (Cl. 343—11)

The present invention relates to data presentation apparatus for directional radio systems such as radar systems, and particularly to apparatus suitable for the indication of positions of energy reflecting objects in a wide field of search of a radar system.

The position of a remote object, which may be obscured to visual observation by rain or fog, may be ascertained by employment of a radar system or radio object direction and range finding apparatus. A radar system in one well-known form employs an ultra high frequency radio pulse transmitter and an ultra high frequency receiver, the pulse transmitter being employed for the recurrent production of high power ultra high frequency energy pulses, and the receiver being employed to receive the relatively weak energy pulses which are reflected back from a distant object upon which the transmitted energy impinges. Ordinarily, a directive antenna is incorporated in the radar system for confining the transmitted energy directions or the received energy directions, or both, to a very small angular zone, such as a zone of angular extent of the order of 3°. This antenna may be periodically moved or scanned throughout a wide directive range, and the direction of a remote object may be determined according to the direction of the antenna at the moment of maximum signal strength of energy reflected from the object. The distance of the object is determined according to the time delay between transmission of a radio energy pulse and reception of the corresponding reflected energy pulse.

The location of remote objects, in terms of distance and direction, may be portrayed upon an indicating apparatus coupled to the radar transmitter and receiver units. Such indicating apparatus usually incorporates an oscilloscope or related apparatus. The oscilloscope may include cathode ray beam generation and intensity control elements and beam deflection elements. Heretofore, such indicators have been employed for azimuthal search indicators, the oscilloscope beam being deflected horizontally through an appreciable extent synchronously with the horizontal or azimuthal scanning of the radar directive antenna, and being recurrently deflected vertically at substantially uniform speed in synchronism with the production of the recurrent radio energy pulses by the transmitter. With such an arrangement, the height of the deflectable beam at any instant of reflected pulse reception represents the distance of the object from which the energy pulse was reflected. The beam intensity is controlled according to the output signals produced by the radar receiver, so that a distinctive mark is produced upon the indicator screen at a height representing the distance of the energy reflecting object and at an azimuthal position on the screen representing the azimuth direction of the object.

Such indicator arrangements have been made to perform satisfactorily where the directive antenna of the radar system merely scans at a substantially uniform rate through a wide range of azimuthal directions. Recently, however, it has been found desirable to provide a supplemental type of motion to the directive antenna, e. g., a conical scanning motion throughout a small angular range, in combination with the wide-range azimuthal scanning thereof. The combination of these two types of movement results in the sweep of the directive radar energy pattern through a projected pattern corresponding to the sum of a low speed straight component of motion and a high speed circular component of motion, the resultant projection pattern resembling a well-known practice form taught in the Palmer system of penmanship. Accordingly, this mode of operation of the radar search antenna has been named "Palmer Scan." Although the type of indicator above described is usable to some extent in connection with a radar system employing the Palmer scan mode of search, the dots or distinctive marks produced upon the oscilloscope pattern to indicate the positions of detected objects are caused to be extended into dashes or horizontal lines of appreciable length, resulting in some confusion and in reduced definition and brilliance of the object-indicating marks. Furthermore, relatively weak signals, such as those produced when a very distant object is detected, are made so indistinct that they may be obscured by minor oscilloscope beam intensity variations due to random noise.

It is an object of the present invention to provide improved data presentation apparatus, and particularly, to provide data presentation apparatus ideally suited for use with radar search systems wherein the Palmer scan or a related search method is employed.

In accordance with a principal feature of the invention, the lateral deflection of the oscilloscope beam is not varied merely at a uniform rate through a wide range as the radar directive antenna direction is generally changed through a corresponding wide azimuthal range, but instead, the lateral beam deflection of the oscilloscope is varied in accordance with the sum of two components, including a high-frequency, low-amplitude component introduced in synchronism with the narrow range, high-speed variation of the antenna direction. Accordingly, the oscilloscope beam is made to move from one side to the opposite side of the azimuth directional pattern in a series of small lateral oscillations in precise synchronization with the azimuthal component of movement of the radar directive antenna pattern. As a result, accurately defined, clear and distinctive radar object images are formed on the screen, showing the exact positions of detected objects and contrasting markedly with the background intensity variations due to random noise.

With such sharp definition of the radar object images, no confusion is produced even when two objects at substantially equal distances from the radar system and at only slightly different azimuthal angles therefrom are indicated on the screen, such objects being represented by two dots very close together, and at substantially equal heights on the screen. Without the features of the present invention, such dots would be merged into one broad mark, preventing the radar operator from distinguishing the images, or even from recognizing the existence of a plurality of objects at the indicated distance.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above objects and general description will now be amplified by a more detailed description of an embodiment of the present invention, as illustrated in the drawings, wherein:

Fig. 7 is a circuit diagram showing the incorporation of the present invention in a radar object position indicator.

Like reference characters are used throughout the drawings to indicate corresponding parts thereof.

Figure 1:
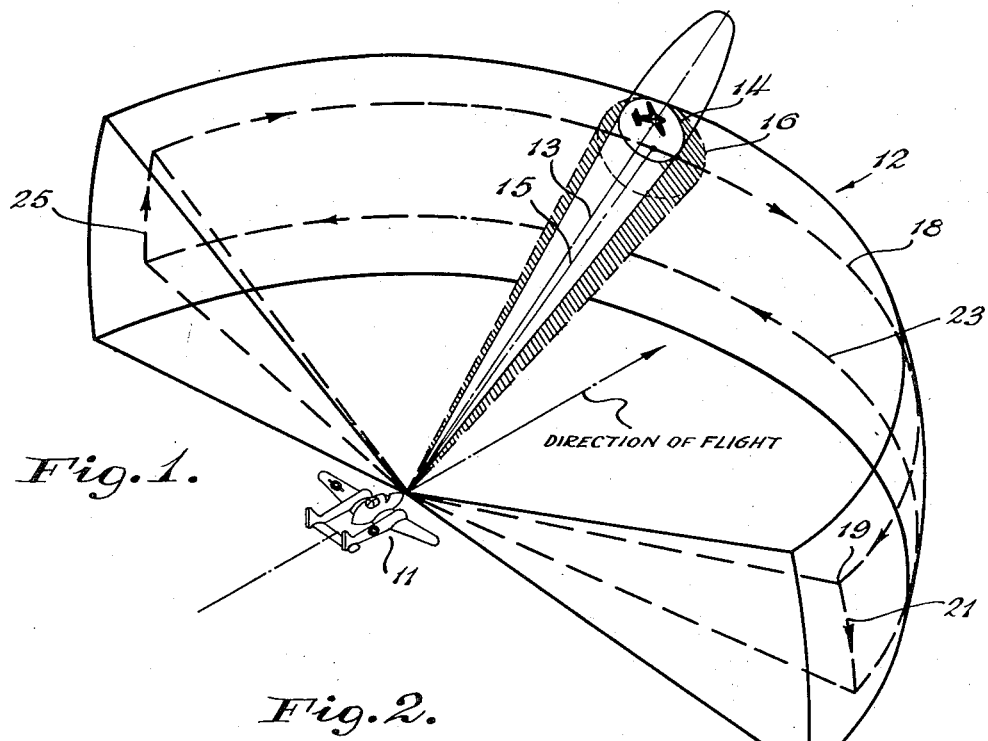
Figs. 1, 2 and 3 illustrate a version of the Palmer scan as employed in a search radar system.

In Fig. 1, there is indicated a craft 11 within which is incorporated a radar system for the detection and position indication of objects located within a wide azimuthal range of directions. Fig. 1 shows a spherical projection 12 of the directional range searched by the radar system. This range may be made of the order of 180° or even greater in azimuthal extent, and it may be made to extend through a range of angles of elevation appreciably greater than the angular extent of the radar directive antenna pattern, by the employment of conical scanning at high speed concurrently with the lower-speed scanning through the wide azimuthal range. For even more extended coverage in angle of elevation, the antenna system may be scanned to the right at a first average angle of elevation and to the left at a second average angle of elevation. In Fig. 1, the axis of the antenna directive beam is indicated at 13 and the angular extent of the beam is indicated by the projection circle 14. This directive pattern, having the axis 13 and the extent indicated at 14, may be regularly moved at a very high speed according to a conical plan of movement, wherein the directive antenna pattern is swept throughout a conical zone about an axis 15, affording coverage of a projected area indicated by the projection circle 16.

Along with this movement throughout a narrow-range conical zone of the directive pattern of the antenna, there may be exerted on the antenna a general movement to the right in azimuth as indicated along the projection arc 18, so that a broad angular range in azimuth will be searched. Furthermore, at the end 19 of the movement of the antenna system to the right, the antenna direction may be depressed substantially vertically, as along projection line 21, to a lower angle of elevation as denoted by the arc 23, and the directive antenna pattern may then be swept to the left along this projection arc until a left hand limit 25 is reached, the antenna elevation angle then being increased and the scan cycle being repeated.

Figure 2:
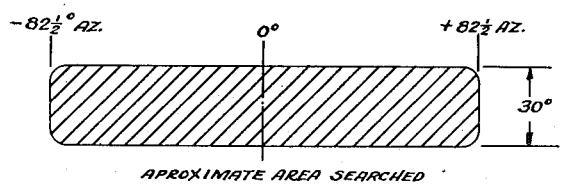

The overall extent of the directions searched by the antenna system during movement throughout this range is indicated in Fig. 2, this figure being substantially a developed cylindrical projection of a typical Palmer search range of directions, and including angular dimensions corresponding to such a directional range.

Figure 3:
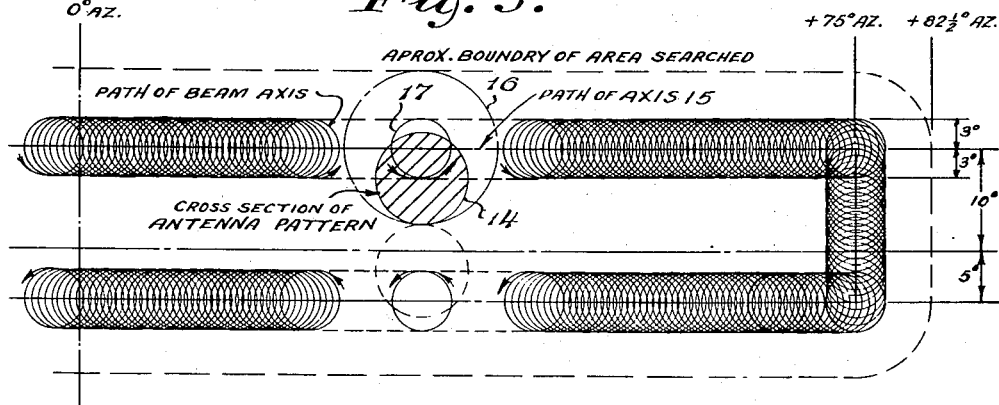

Fig. 3 is a further developed cylindrical projection showing the resultant path of the directive antenna pattern axis 13, and indicating the relative extents of the directive pattern projection 14, the conical search projection 16, and the projected orbit 17 of movement of the directive pattern axis 13 throughout the conical search cycles. The azimuthal extent of the projection set forth in Fig. 3 corresponds to the right-hand half of the total search projection area illustrated in Fig. 2.

Figure 4:
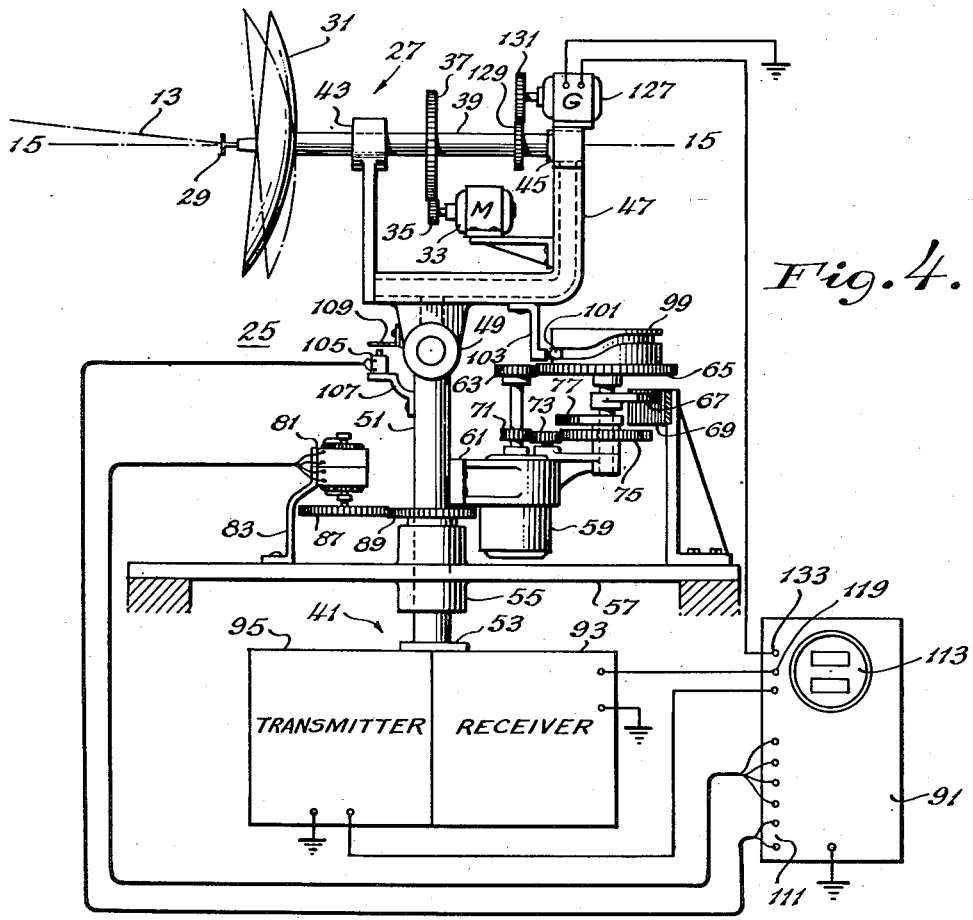
Fig. 4 is a side elevation of a schematic arrangement of radar apparatus adapted for the Palmer search scan method.

Fig. 4 illustrates a schematic radar system 25 wherein a directive antenna 27 is conically scanned about an axis 15, the relation of the antenna exciter element 29 and a paraboloidal reflector 31 associated therewith being such that the directive pattern of the antenna is aimed along a slightly divergent axis 13. This relation may be produced by a slight inclination of the reflector 31 from alignment of its axis with the rotation axis 15, or by location of the exciter element 29 at a point very slightly displaced from the focal point of the reflector 31.

A high-speed motor 33 may be coupled through gears 35 and 37 to a longitudinally-extending conduit section 39 which may be arranged both for conducting energy between the directive antenna 27 and the radar apparatus 41 and for supporting the antenna 27 for rotation about the axis 15 in bearings 43 and 45. The conduit section 39 may be joined in a rotation-permitting junction at bearing 45 to a further conduit section 47, which may be coupled in turn through a still further rotation-permitting junction 49, a vertical column conduit section 51, and a final rotation-permitting junction 53 to the radar apparatus 41. All of the conduit members 39, 47, and 51 may be hollow conductive sleeves serving as wave guides, or any desired ones of the conduit members may include inner conductors, and thus may be employed as coaxial transmission lines.

The main vertical column 51 may be arranged for rotation in a vertical-axis bearing 55 provided in a fixed platform 57. An azimuth and elevation drive motor 59 affixed to the column 51 by a bracket 61 may be coupled through spur gears 63 and 65 to a sector gear 67, arranged to engage an internal sector gear 69 affixed to the platform 57. Motor 59 may also be coupled through a further chain of spur gears 71, 73 and 75 to a further sector gear 77 rotated in the opposite direction but at equal speed with the rotation of sector gear 67, and also arranged for engagement with the fixed sector gear 69. The sector gears 67 and 77 alternately engage the fixed sector gear 69, in such a way that the entire rotatable assembly supported in bearing 55 is rotated first to the right and then to the left with the alternate engagements of the rotating sector gears 67 and 77. A dual potentiometer unit 81 supported from the platform 57 on a bracket 83 may be coupled to the vertical column 51 through gears 87 and 89 and employed for supplying to an indicator unit 91 a principal horizontal deflection signal voltage varying exactly according to the rotation of column 51 relative to platform 57.

The radar apparatus 41 includes a receiver 93 coupled to the indicator unit 91 and a transmitter 95 also coupled to the indicator unit, for enabling the indicator unit 91 to show the distance of an energy reflecting object determined in accordance with the time delay between generation of a radar transmission pulse by transmitter 95 and the detection of the reflected energy pulse by the radar receiver 93.

Figures 5, 6:
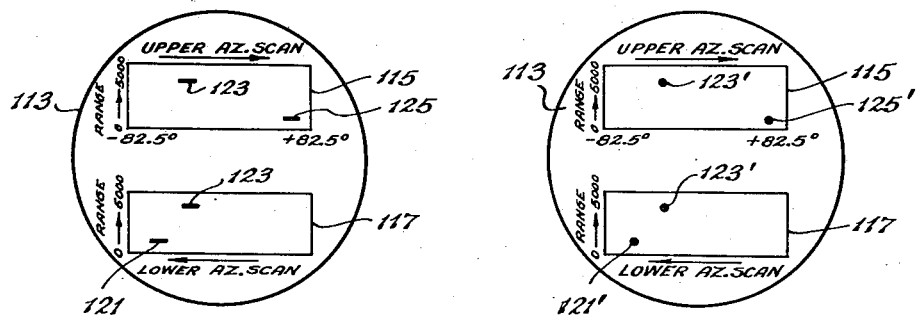
Fig. 5 is an illustration of a type of radar scan oscilloscope indication resulting before the introduction of the high frequency lateral oscillatory beam deflection movement according to the present invention.
Fig. 6 illustrates an indicator presentation, with improved image definition resulting from the incorporation of the features of the present invention.

According to an invention of J. M. Fetherolf, disclosed and claimed in copending patent application Serial No. 676,188, filed June 2, 1946, and assigned to the assignee of the present invention, the indicator 91 may be arranged for portraying radar object information in a pattern comprising two similar plots, as shown in Figs. 5 and 6, each of which indicates the "range," or distance of an energy reflecting object plotted against the azimuth angle of the object direction. One of the plots 115 is employed for indicating radar signals received during a sweep at a first elevation angle of the antenna system, as the sweep to the right along the line 18 (Fig. 1), and the other plot 117 is employed to indicate the signals resulting during the opposite sweep, as along line 23, to the left. The changes of elevation angle of the antenna 27 may be effected by a cam 99 fixed to gear 65 and a cam follower 101 fixed by a bracket 103 to the rigid conduit section 47. A switch 105, which may be supported on a bracket 107 from column 51 and may be actuated by the cooperative action of a bracket 109 affixed to the assembly supported at junction 49, is connected to a pair of terminals 111 of the indicator 91, and may be employed to introduce a vertical deflection shift voltage in the oscilloscope 113 included in the indicator 91, for shifting the movement of the oscilloscope beam from the upper plot 115, as shown in Fig. 4, to the lower plot 117, synchronously with the downward shift of the elevation angle of antenna 27 effected by cam 99.

The indicator unit 91 includes a saw-tooth wave generator connected to oscilloscope 113 for vertical beam deflection. This generator is adjusted to operate at a frequency corresponding to the repetition rate of pulse generation by transmitter 95, and is synchronized with the transmitter 95 in such a way that each vertical sweep of the oscilloscope beam is initiated synchronously with the transmission of a corresponding radar energy impulse. The output terminals of the receiver 93 are connected to a beam intensity terminal 119 of the indicator 91, for varying the oscilloscope beam intensity at the instants of reception of energy reflected from a remote object.

As a result of the conical scan component produced by the rapid rotation of the antenna 27 by motor 33, relatively strong energy impulses are received from a remote object not only when the vertical column 51 has been rotated just to the position for alignment of the axis 15 toward the target, but also during an appreciable length of time before and after arrival of the column 51 at this point, because the coverage of the antenna pattern is effectively broadened by the conical scanning of the antenna. As a result, energy-reflecting objects are represented by images 121, 123 and 125 which are horizontally extended marks, characterized by relatively poor definition and by considerable difficulty of discernibility.

In accordance with the present invention, the poor definition of the object-indicating images with Palmer scan is overcome by the introduction into the oscilloscope lateral beam deflection voltage circuit of an alternating voltage component produced by a generator 127 operated synchronously with the rotation of antenna 27. The generator 127 is so coupled to the antenna 27, as by coupling gears 129 and 131, that the sinusoidal output voltage produced by the generator accurately represents the azimuthal component of movement of the antenna 27 produced by the rotation thereof about axis 15. This voltage produced by the generator 127 is supplied to a terminal 133 of the indicator 91.

The circuit details of an embodiment of the present invention are set forth in Fig. 7. The oscilloscope 113 may be of the cathode ray type, provided with a cathode 135, an electron beam accelerating electrode 137, a beam intensity control electrode 139, horizontal deflection apparatus such as a pair of horizontal deflection plates 141, and vertical deflection elements such as a pair of vertical deflection plates 143. A substantially circular fluorescent screen 145 may be provided therein for impingement of the electron beam, to provide an illuminated mark where the beam impinges thereon during application of an intensifying voltage to control electrode 139.

The saw-tooth sweep wave generator is indicated at 140. This generator includes an input frequency control terminal 142 connected to a sychronizing pulse terminal 144 of the transmitter 95. The high potential output terminal 146 of the saw-tooth wave generator 140 is coupled through a voltage divider resistance circuit 149 and a coupling capacitor 151 to the control electrode of a cathode follower amplifier stage 153. The control electrode of this stage is connected to a grid resistor 155 connected in turn to the switch 105 which is operated in accordance with change of elevation angle of the antenna 27 (Fig. 4). The switch 105 may be employed for selective connection to different points on a voltage divider resistor 157 connected across a voltage source 159. When the movable arm 161 of the switch 105 is thrown from one position to the other, in response to the change of tilt of the antenna system 27, it changes the voltage applied to the control electrode of the cathode follower amplifier stage 153 from a first predetermined voltage to a second, for shifting the range of vertical sweep of the oscilloscope 113 from a first range to a second range. The second range is sufficiently removed from the first so that two separate plots such as the plots 115 and 117 in Fig. 5 are alternately scanned by the cathode ray oscilloscope beam in synchronism with the alternate scans of the directive antenna 27 to the right along arc 18 and to the left along arc 23, respectively (Fig. 1).

The output voltage of cathode follower 153, developed across cathode output resistor 165, is applied to the input terminals of a direct coupled amplifier 167, and the output terminals of the amplifier 167 are connected to the vertical deflection plates 143 of the oscilloscope 113.

The high potential output terminal 171 of the receiver 93 is coupled through a capacitor 173 to the control electrode circuit of a cathode follower amplifier stage 175, and the output terminal 177 of the cathode follower stage 175 is connected to the control electrode 139 of the oscilloscope 113, for changing the intensity of the oscilloscope beam in response to changes of output voltage of the radar receive 93.

The horizontal sweep circuit of the cathode ray oscilloscope 113 includes connections between the horizontal deflection plates 141 and the movable arms 181 and 183 of the dual potentiometer 81. These arms move together on stator resistor elements 185 and 187, respectively, connected between the negative and positive terminals of a battery 189 having a mid-tap 191 connected to the accelerating electrode 137. In accordance with an important feature of the present invention, a coupling circuit including a series resistor 193 and a coupling capacitor 195 is connected to the horizontal sweep circuit and the capacitor 195 is connected to a potentiometer 197 connected between the output terminals of the generator 127 which, as shown in Fig. 4, is operated synchronously with the rotation of generator 127. Through the coupling circuit 197, 195, 193, the generator 127 adds to the positional output voltage from the dual potentiometer 81, a higher-frequency alternating voltage component corresponding in phase and relative magnitude with that component of motion of the directive axis 13 of antenna 27 about the axis of the column 51 resulting from the rotation of the antenna 27 by motor 33. Accordingly, the voltage between the deflection plates 141 varies with time in such a way that the beam through the oscilloscope 113 moves horizontally in exact accordance with the azimuthal resultant movement of the antenna 27 due to the combined effects of the low speed oscillatory rotation of the column 51, and the high speed movement of the antenna by the motor 33.

The improvement effected in the indicated signal is indicated by comparison of Figs. 5 and 6. In Fig. 6, the images 121', 123' and 125' indicating three different objects within the field of search of the radar system are formed as distinct, clean-cut dots rather than the elongated, and hence less distinct dashes 121, 123 and 125 seen in Fig. 5. This results from the fact that the electron beam in the oscilloscope is swept from left to right in the upper azimuth scan pattern 115 and from right to left in the lower azimuth scan pattern 117, in a series of high frequency, low amplitude oscillatory movements instead of a continuous movement such as was provided with prior radar search indicator systems.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for supplying to a radar operator data representing the posotion of an energy-reflecting object detected by a radar system wherein a directive radar antenna is periodically scanned throughout a zone according to the sum of a conical movement produced by rotation of the directive axis of said antenna about a cone axis slightly divergent therefrom and concurrent regular angular movement of said cone axis about a transverse axis of rotation, said apparatus comprising: oscilloscope means for production and intensity control and deflection of a spot-illuminating beam; means for varying the intensity of said beam in accordance with variations of strength of signal energy reflected from an energy-reflecting object; means responsive to rotation of said antenna directive axis about said cone axis for producing a first alternating voltage synchronous therewith; means responsive to angular movement of said cone axis about said transverse axis for producing a second voltage varying in accordance therewith; means jointly responsive to said first and second voltages for varying the deflection of said beam in a first component direction according to the resultant angular movement of the antenna directive axis about said transverse axis; and means for varying the deflection of said beam in a second component direction at a radar pulse repetition rate of frequency appreciably higher than the frequencies of the components of movement of said antenna.

2. A radio object direction and distance determining system comprising: radio means including a recurrent radio pulse transmitter and a receiver for transmission of radio energy pulses to a remote object and reception of reflected energy pulses arriving from said object and delayed after the transmission of the corresponding pulses according to the distance of said object; means including a movable directive antenna coupled to said radio means for concentration of the momentary effectiveness of said radio means along a predetermined directive axis; means operatively coupled to said directive antenna means for producing regular rotation of said directive axis at a first speed through a narrow conical locus about a cone axis slightly divergent from said directive axis; means operatively coupled to said directive antenna means for producing rotation of said cone axis about a transverse axis at a rotational speed different from said first speed; oscilloscope means for production and intensity control and deflection of a spot-illuminating beam, said oscilloscope means being coupled to said radio means for control of the intensity of said beam in accordance with variations of output signals from said receiver; means for recurrently sweeping said beam through a distance range corresponding to a range of distances of detected objects, said recurrent sweeping means being synchronized with said pulse transmitter, whereby the distinctive mark resulting from reception of a delayed reflected energy pulse is made to appear at a position on said oscilloscope corresponding to the distance of said energy-reflecting object; and means for varying the deflection of said beam according to the variation of the direction of said directive axis about said transverse axis, said last-named means comprising means jointly responsive to said rotation of said directive axis about said cone axis and to said rotation of said cone axis about said transverse axis for varying the deflection of said beam in accordance with the algebraic sum resultant of the components about said transverse axis of rotation of said directive axis, whereby the position of a distinctive mark on said oscilloscope represents the direction of said directive axis about said axis of rotation at the instants of reception of energy reflected from said object.

3. Radar apparatus comprising intercoupled radar pulse transmitting and receiving means, directive antenna means coupled thereto, means for regularly sweeping said directive antenna means throughout a wide range of directions about a selected axis at a first rate and with low amplitude angular advances and retardations about said axis at a second rate far exceeding said first rate, oscillograph means coupled to said transmitting and receiving means and including a screen and a deflectable beam impinging thereon for illuminating a selected spot, means responsive to said low amplitude advances and retardations about said axis for producing a first alternating voltage synchronous therewith, means responsive to the wide range sweeping of said directive antenna means about said selected axis for producing a second voltage synchronous therewith, means jointly responsive to said first and second voltages for varying the deflection of said deflectable beam in a first direction according to the resultant angular movement of said directive antenna means about said axis, and means for varying the deflection of said beam in a direction transverse said first direction in synchronism with the transmitted radar pulses.

JOHN M. LESTER.

REFERENCES CITED

The following references are of record in the file of this patent:

UNITED STATES PATENTS

| Number | Name | Date |
|---|---|---|
| 2,083,242 | Runge | June 8, 1937 |
| 2,410,666 | Leck | Nov. 5, 1946 |
| 2,412,702 | Wolff | Dec. 17, 1946 |
| 2,417,248 | Godet | Mar. 11, 1947 |
| 2,421,663 | Tolson | June 3, 1947 |
| 2,446,024 | Porter | July 27, 1948 |